(12) United States Patent
Li et al.

(10) Patent No.: US 11,425,756 B2
(45) Date of Patent: Aug. 23, 2022

(54) DATA TRANSMISSION METHOD AND APPARATUS

(71) Applicant: ZTE CORPORATION, Shenzhen (CN)

(72) Inventors: Xincai Li, Shenzhen (CN); Yajun Zhao, Shenzhen (CN); Ling Yang, Shenzhen (CN); Hanqing Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 508 days.

(21) Appl. No.: 16/324,771

(22) PCT Filed: Jul. 26, 2017

(86) PCT No.: PCT/CN2017/094518
§ 371 (c)(1),
(2) Date: May 10, 2019

(87) PCT Pub. No.: WO2018/028434
PCT Pub. Date: Feb. 15, 2018

(65) Prior Publication Data
US 2021/0259020 A1  Aug. 19, 2021

(30) Foreign Application Priority Data
Aug. 11, 2016  (CN) .......................... 201610658762.X

(51) Int. Cl.
*H04W 72/12* (2009.01)
*H04W 74/08* (2009.01)
(Continued)

(52) U.S. Cl.
CPC ...... *H04W 74/0833* (2013.01); *H04B 7/0452* (2013.01); *H04W 72/044* (2013.01); *H04W 72/12* (2013.01)

(58) Field of Classification Search
CPC ....................................................... H04W 72/12
See application file for complete search history.

(56) References Cited

U.S. PATENT DOCUMENTS

| | | | |
|---|---|---|---|
| 2012/0213196 A1* | 8/2012 | Chung | H04W 74/08 370/330 |
| 2013/0010774 A1* | 1/2013 | Subramanian | H04W 74/0808 370/338 |
| 2013/0208656 A1 | 8/2013 | Park | |

FOREIGN PATENT DOCUMENTS

| CN | 101754396 A | 6/2010 |
|---|---|---|
| CN | 103516466 A | 1/2014 |

(Continued)

OTHER PUBLICATIONS

English Translation of International Search Report for International Application No. PCT/CN2017/094518 dated Oct. 20, 2017, 2 pages.

(Continued)

*Primary Examiner* — Angel T Brockman
(74) *Attorney, Agent, or Firm* — Cantor Colburn LLP

(57) ABSTRACT

Disclosed is a data transmission method, including: determining, on pre-divided contention access-based resources for data transmission, contention resources for data transmission; and performing resource contention on determined contention resources, and transmitting data on the resource obtained by the contention.

14 Claims, 2 Drawing Sheets

(51) Int. Cl.
 H04B 7/0452 (2017.01)
 H04W 72/04 (2009.01)

(56) References Cited

FOREIGN PATENT DOCUMENTS

| | | |
|---|---|---|
| CN | 105636231 A | 11/2014 |
| CN | 104301273 A | 1/2015 |
| CN | 105722222 A | 6/2016 |
| CN | 105848165 A | 8/2016 |
| WO | 2010147039 A1 | 12/2010 |

OTHER PUBLICATIONS

Chinese Office Action for corresponding 201610658762.X; Report dated Jun. 1, 2022.
Chinese Search Report for corresponding 201610658762.X; Report dated May 25, 2022.

\* cited by examiner

DATA TRANSMISSION METHOD AND APPARATUS

CROSS-REFERENCE TO RELATED APPLICATION

This application is the 371 application of PCT Application No. PCT/CN2017/094518, filed Jul. 26, 2017, which is based upon and claims priority to Chinese Patent Application No. 201610658762.X, filed Aug. 11, 2016, the entire contents of which are incorporated herein by reference.

TECHNICAL FIELD

The present disclosure relates to, but is not limited to, the field of wireless communication technologies, and more particularly, to a data transmission method and apparatus.

BACKGROUND

In the Long Term Evolution (LTE) system, when a terminal performs an uplink access, if user equipment (UE) has data to be transmitted, a scheduling request is transmitted firstly, and then a base station transmits a resource allocated by uplink grant information for use, and the terminal may transmit uplink data according to this scheduling information. The related information used for terminal data transmission, such as coded modulation mode, resource location and packet size, are all controlled by the base station. Moreover, this transmission mode may cause the delay of uplink data transmission and the overhead of related control signaling.

With the wide application of the Internet of Things and the continuous increase of wireless terminals, the original terminal data transmission method based on base station scheduling will face enormous challenges. At the same time, the efficiency of spectral usage and user access capabilities need to be significantly improved. For example, in the case of Multi-Machine type communication (mMTC) scenario, if each terminal still follows the original access procedure, the spectral efficiency will be very low. Therefore, the grant-free data transmission mode will be a good choice. This access mode can significantly reduce signaling overhead, shorten access delay, and save power consumption of the terminal.

However, under normal circumstances, the user equipment with the grant-free access mode randomly selects the resource to directly transmit data. For the orthogonal multiple access system, this method will inevitably cause resource collision, especially in the scenario of massive connection. Although the current novel non-orthogonal multiple access (NOMA) technology can achieve a certain degree of system spectral efficiency improvement by superposition transmission of transmitting signals in the space domain/time domain/frequency domain/code domain, the algorithm depends entirely on performance of a receiving end, and when the receiving end know nothing about information of a transmitting end or when there are too many UEs accessed simultaneously, the performance needs to be further verified, so that the communication of data under the massive connection cannot be effectively supported.

This section provides background information related to the present disclosure which is not necessarily prior art.

SUMMARY

The following is an overview of the topics detailed in this disclosure. This summary is not intended to limit the protection scope of the claims.

The embodiments of the disclosure provide a method and apparatus for data transmission, so as to reduce resource collision between UEs during scheduling-free access under the normal conditions, and reduce delay caused by retransmission.

The embodiments of the present disclosure provide a method for data transmission, including:

determining, on pre-divided contention access-based resources for data transmission, contention resources for data transmission; and performing resource contention on determined contention resources, and transmitting data on the resource obtained by the contention.

In one embodiment, the determining the contention resources for data transmission is implemented by any one of following manners:

determining the contention resources for data transmission by first reading declarative information of occupied resource or indication information of occupied resource transmitted by other equipment; or determining the contention resources for data transmission according to configuration information or dynamic signaling in a radio resource control (RRC) message of a base station.

In one embodiment, the dynamic signaling includes: predefined downlink control information (DCI) that is scrambled by a radio network temporary identity or a specific information identity; or group scheduling DCI that scrambled by a specific radio network temporary identity or a specific information identity.

In one embodiment, when the resource contention is performed on a licensed carrier, the resource contention is performed by any of following manners:

performing the resource contention by using a load-based equipment with random backoff; or performing the resource contention by using a frame-based equipment with a specified period.

In one embodiment, the transmitting the data on the resource obtained by contention includes:

transmitting the data directly on the resource obtained by contention; or receiving usage information of the contention resource transmitted by other UE firstly, and then selecting remaining contention resource to directly transmit the data.

In one embodiment, when the resource contention is performed on an unlicensed carrier, the transmitting the data on the resource obtained by contention includes:

detecting whether an energy of a signal on the carrier is less than a threshold, if the value is less than the threshold, transmitting the data; and if the threshold is greater than or equal to the threshold, performing a signal identification to identify whether the carrier is being used by a UE in present cell, if yes, transmitting the data on the carrier, and if not, transmitting no data.

In one embodiment, a subframe structure of the transmitted data includes:

one subframe, including a control area and a data area; or one subframe, including a preamble, a signaling area and a data area.

In one embodiment, the preamble is used to perform uplink synchronization, channel estimation or occupancy indication; and the control area or the signaling area or the data area carries identification information of a terminal.

In one embodiment, the transmitting the data on the resource obtained by contention includes:

transmitting data of m subframes continuously, wherein, m is greater than or equal to 1 and less than or equal to k, and k is a predefined value or a semi-statically configured value.

In one embodiment, when the data of m subframes is continuously transmitted, one or two symbols on a time frequency resource are specified to be blank.

In one embodiment, the transmitting the data on the resource obtained by contention is implemented by any of following manners:

using different frequency resources with other UE in the same cell by means of frequency division multiplexing (FDM); or using same frequency resource with other UE in the same cell simultaneously by means of Multi-User Multiple-Input Multiple-Output (MU-MIMO); or using same frequency resource with other UE in the same cell simultaneously by means of Non-orthogonal Multiple Access (NOMA); or using same frequency resource with other UE with same operator.

In one embodiment, frequency resource patterns for resource contention by the equipment that transmits data by using the same frequency resource simultaneously by means of MU-MIMO are the same; or frequency resource patterns for resource contention by the equipment that transmits data by using the same frequency resource simultaneously by means of NOMA are the same.

In one embodiment, the preamble is associated with and corresponds to the equipment that transmits data by using the same frequency resource simultaneously by means of MU-MIMO; or the preamble is associated with and corresponds to the equipment that transmits data by using the same frequency resource simultaneously by means of NOMA.

In one embodiment, the contention resource is a specific resource or a resource shared by multiple equipments.

In one embodiment, the contention resource includes: consecutive M physical resource blocks (RBs); consecutive N resource particles; K interleaving units; L narrow band; or P clusters, wherein, M, N, K, L, P are positive integers greater than or equal to 1 and less than a predefined value.

In one embodiment, the performing the resource contention on the determined contention resources is implemented by any of following manners:

according to a predefined value;

according to a network side configuration;

according to a signaling indication; or according to a network side configuration and a signaling indication.

In one embodiment, the predefined rule includes at least one of:

transmitting a Scheduling Request (SR) in a resource contention-based mode, and if scheduling indication information is received, transmitting the data according to the scheduling indication information;

transmitting a data packet for the first time in the resource contention-based mode, and retransmitting the data packet in a scheduling access mode;

when a data packet is less than or equal to a threshold, transmitting the data packet in the resource contention-based mode, and when the data packet is greater than the threshold, transmitting buffer status information to a network side to receive resource indication information for scheduling access allocation.

The embodiments of the present disclosure further provide an apparatus for data transmission, including:

a determination module, configured to determine, on pre-divided grant-fee contention access-based resources for data transmission, a contention resource for the data transmission; and a transmission module, configured to perform resource contention on determined contention resources, and transmitting the data on the resource obtained by the contention.

In one embodiment, the determination module is configured to determine the contention resource for data transmission by any of following manners: determining the contention resources for data transmission by first reading declarative information of occupied resource or indication information of occupied resource transmitted by other equipment; or determining the contention resources for data transmission according to configuration information or dynamic signaling in a radio resource control (RRC) message of a base station.

The dynamic signaling includes: predefined downlink control information (DCI) that is scrambled by a radio network temporary identity or a specific information identity; or group scheduling DCI that is scrambled by a specific radio network temporary identity or a specific information identity.

In one embodiment, the transmission module is configured to perform, when the resource contention is performed on a licensed carrier, the resource contention by any of following manners: performing the resource contention by using a load-based equipment with random backoff; or performing the resource contention by using a frame-based equipment with a specified period.

In one embodiment, the transmission module is configured to transmit data directly on the resource obtained by the contention; or receive usage information of the contention resource transmitted by other UE firstly, and then select remaining contention resource to directly transmit the data.

In one embodiment, the transmission module is configured to detect, when the resource contention is performed on an unlicensed carrier, whether an energy of a signal on the carrier is less than a threshold, if the value is less than the threshold, transmit the data directly; and if the threshold is greater than or equal to the threshold, perform a signal identification to identify whether the carrier is being used by a UE in present cell, if yes, transmit the data on the carrier, and if not, transmit no data.

In one embodiment, a subframe structure of the data includes: one subframe, including a control area and a data area; one subframe, including a preamble, a signaling area and a data area, the preamble being used to perform uplink synchronization, channel estimation or occupancy indication; the control area or the signaling area or the data area carries identification information of a terminal.

In one embodiment, the transmission module is configured to transmit data of m subframes continuously, wherein, m is greater than or equal to 1 and less than or equal to k, and k is a predefined value or a semi-statically configured value, and when the data of m subframes is continuously transmitted, one or two symbols on a time frequency resource are specified to be blank.

In one embodiment, the transmission module is configured to transmit the data on the resource obtained by the contention by any of following manners: using different frequency resources with other UE in the same cell by means of frequency division multiplexing (FDM); or using same frequency resource with other UE in the same cell simultaneously by means of Multi-User Multiple-Input Multiple-Output (MU-MIMO); or using same frequency resource with other UE in the same cell simultaneously by means of Non-orthogonal Multiple Access (NOMA); or using same frequency resource with other UE with same operator.

The embodiments of the present disclosure provide a method for data transmission, including:

transmitting resource allocation information; and blindly detecting and receiving data, and demodulating the received data.

In one embodiment, the resource allocation information is transmitted through a high layer signaling configuration or dynamic control information.

In one embodiment, the blindly detecting and receiving data includes:

receiving data according to a demodulation reference signal sequence, an occupancy signal or a preamble signal, or identification information of a UE contained in a data area, a control area or a signaling area.

In one embodiment, the occupancy signal or the preamble signal is associated with an identity of an equipment transmitting the data The embodiments of the present disclosure provide an apparatus for data transmission, including:

a transmission module, configured to transmit resource allocation information; and a receiving module, configured to blindly detect and receive data, and demodulate the received data.

In one embodiment, the transmission module is configured to transmit the resource allocation information through a high layer signal configuration or dynamic control information.

In one embodiment, the receiving module is configured to receive data according to a demodulation reference signal sequence, an occupancy signal or a preamble signal, or identification information of a UE contained in a data area, a control area or a signaling area.

The embodiments of the present disclosure further provide a computer readable storage medium for storing computer executable instructions, and the computer executable instructions are executed to implement the data transmission method.

In summary, the embodiments of the present disclosure provide a method and an apparatus for data transmission. On one hand, it can be used for licensed carriers to reduce resource collision between UEs in grant-free access under normal conditions, and reduce delay caused by retransmission. On the other hand, it can also meet the regional regulatory requirements for data transmission by unlicensed carriers. In addition, the delay and the overhead of control signaling caused by the original licensed-based access are reduced, and the resource utilization rate can be improved.

Other aspects will be apparent upon reading and understanding the drawings and detailed description.

This section provides a summary of various implementations or examples of the technology described in the disclosure, and is not a comprehensive disclosure of the full scope or all features of the disclosed technology.

DETAILED DESCRIPTION

Embodiments of the present disclosure will be described in detail below with reference to the accompanying drawings. It should be noted that, in the case of no conflict, the embodiments in the present disclosure and the features in the embodiments may be arbitrarily combined with each other.

First Embodiment

Figure 1:
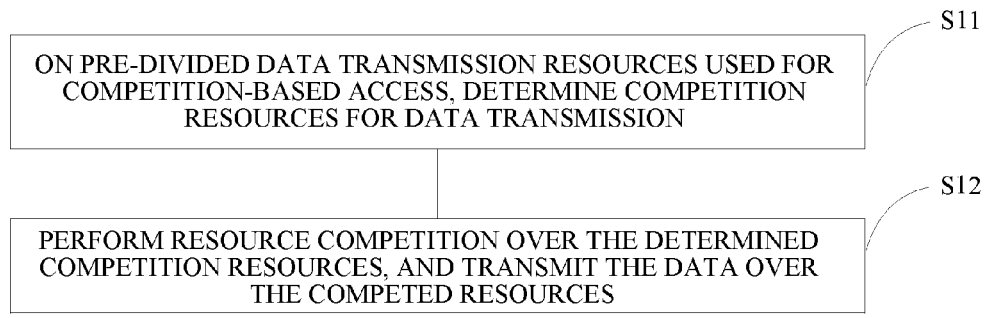
FIG. 1 is a flowchart illustrating a method for data transmission at a transmitting end according to an embodiment of the present disclosure.

This embodiment provides a data transmission method, as shown in FIG. 1, including the following steps.

In step S11, on pre-divided contention access-based resources for data transmission, a contention resource for data transmission is determined.

In step S12, resource contention is performed on determined contention resource, and the data is transmitted on the resource obtained by the contention.

When a transmitting end (for example, user equipment) has data to be transmitted, the contention resources for contention access are determined firstly, and then the resource contention is performed on the determined contention resources, after determining that the access is possible, the data is transmitted on the corresponding contention resource, that is, the resource is used.

In this embodiment, the frequency resource within the system bandwidth is divided into at least two parts, the first part of the frequency resource is used for data transmission based on scheduling, and the second part of the frequency resource is used for scheduling-free data transmission based on autonomously contention access of the terminal. The "pre-divided resource contention access-based resources for data transmission" in step S11 refers to the second part of the frequency resource.

The resource division may be configured by the base station semi-statically through a Radio Resource Control (RRC) message and/or notified by dynamic signaling.

The determination of the contention resource includes any of the following methods.

In the first method, the UE selects a frequency resource to be used by itself.

Further, the UE determines the resource that can be used by the UE itself by first reading the declarative information of occupied resource or indication information of occupied resource transmitted by other UE.

In the second method, the contention resource is configured by a base station.

The base station semi-statically configures the resource through RRC, or dynamically notifies the resource to be used by the UE through Downlink Control Information (DCI).

The UE determines the resource for data transmission according to configuration information or dynamic signaling in RRC message of the base station.

For autonomous access, the terminal first performs Clear Channel Assessment (CCA) to reduce the probability of collision or break up (scatter) the service in a time domain.

The CCA method includes any of the following methods.

In the first method, the UE directly transmits data on the contended resource directly, or the UE first receives usage information of the contention resource transmitted by other UE, and then selects the remaining contention resource to directly transmit the data.

Further, it is determined by listening to the occupancy signal or the preamble.

In the second method, the resource contention is performed by using Load-Based Equipment (LBE) with random backoff (such as cat4 LBT).

In the third method, the resource contention is performed by using a Frame-Based Equipment (FBE) of a period (such as 1 ms), where t is one subframe or a length of TTI, including 0.1 ms, 0.2 ms, 0.25 ms, 0.5 ms or 1 ms.

For unlicensed carriers, the CCA process also includes a process of identification: when the channel is detected to be used by a site with the same operator in the same cell, the site can also transmit data.

If the base station schedules the UE to transmit data on the licensed carrier resource, the UE does not need to perform Listen before Talk (LBT), and the UE directly transmits data on the allocated resource.

The resource also includes unlicensed carrier resource.

The resource usage manner includes the following manner.

Different frequency resources may be simultaneously used with other UE in the same cell on the licensed carrier through frequency division multiplexing; or the same frequency resource is used simultaneously with other UE in the same cell through Multi-User Multiple-Input Multiple-Output (MU-MIMO); or the same frequency resource is used with other UE in the same cell through Non-orthogonal Multiple Access (NOMA).

The LBT used for the unlicensed carrier resource includes the following manner.

The cat 4 LBT with random backoff and the cat 2 LBT without random backoff are tested according to the pattern. And if the channel is detected to be busy, the process for identifying whether the transmitting UE is a terminal with the same operator in the same cell and system, is further performed.

The use of the unlicensed carrier includes: using different frequency resources simultaneously with other UE through the frequency division multiplexing; or using the same frequency resource simultaneously with other UE with the same operator in the same cell through the MU-MIMO; or using the same frequency resource simultaneously with other UE with the same operator or under the same base station or in the same cell through the non-orthogonal multiple access.

The subframe structure for the UE to transmit data includes one of the following two types of structures.

In the first type, one subframe includes a control area and a data area, and the control area and the data area are transmitted by different symbol time divisions.

In the second type, one subframe includes a preamble, a signaling area and a data area.

A method for data transmission is provided by the embodiment of the present disclosure. On one hand, it can be used for the licensed carriers to reduce resource collision between UEs under normal scheduling-free conditions, and reduce delay caused by retransmission. On the other hand, it can also meet the regional regulatory requirements for unlicensed carrier transmission data. In addition, the delay and the overhead of control signaling caused by the original licensed-based access are reduced, and the resource utilization rate can be improved.

Second Embodiment

In this embodiment, the contended resource during accessing of the UE, and the determination of the resource used after the contention is successful are described in detail.

The determination of the resource to be used for UE data transmission includes any of the following methods.

In the first method, the UE selects the frequency resource to be used by itself.

In the second method, the base station configures the resource to be used by the UE.

Further, the base station semi-statically configures the resource to be used by the UE through RRC, or dynamically notifies the resource to be used by the UE through DCI.

Further, the resource is a UE-specific resource or a resource shared by multiple UEs.

For the UE-specific resource, respective UEs are multiplexed by frequency domain.

For the resource shared by multiple UEs, the UEs may use the resource by the MU-MIMO or the NOMA.

For the resource to be used through DCI dynamic notification, the following are included.

In the first type, the DCI that is scrambled by a special information identity, such as Contention Based-Radio Network Temporary Identity (CB-RNIT), is defined for the allocation of contention resource. The UE monitors the DCI if there is data to be transmitted, and the UE does not need to blindly detect the DCI if there is no data transmission.

In the second type, a group scheduling DCI is transmitted; the DCI is also scrambled by specific information, such as a specific RNTI. The base station allocates UEs with the same geographical location to different groups according to the geographical locations of the UEs. The group of UEs determines the resource for its own use through receiving the DCI.

In the third type, it is transmitted by UE-specific DCI, and the resource allocation fields in the DCI of multiple UEs are the same.

The resource used by the UE includes: consecutive M physical resource blocks (RBs) or resource particles; one or more interleaving units; one narrow band; one or more clusters.

The size of one narrow band is 180 k, or 1 physical resource block, or 1.4 M. One cluster contains consecutive N Physical RBs (PRBs). Each PRB includes 12 subcarriers, each of which has a size of a positive integer multiple of 7.5K.

For an unlicensed carrier, the resource occupies 80% of the system bandwidth and includes at least one interleaving unit, and each interleave unit is composed of N discrete and equally spaced PRBs.

The resource usage methods for contention access also include:

when the terminal does not succeed in Clear Channel Assessment (CCA) at time t, it continues to select another interleaving unit to perform CCA at time t+n. The resource is randomly selected by the UE, or some frequency domain patterns allocated by the base station.

Third Embodiment

This embodiment describes an LBT process performed by the UE before transmitting data on the unlicensed carrier.

After the UE determines the resource to be used according to the method in the second embodiment, if it is an unlicensed carrier, the LBT is performed before the data is transmitted according to the regional regulatory requirements, and the contention process is the process of performing the LBT.

The LBT used for the unlicensed carrier resource includes the following modes: a cat 4 LBT mode with random backoff and a cat 2 LBT mode without random backoff.

The frequency resource location at which the UE performs the LBT includes one of the following cases.

In case 1, full bandwidth of the system, such 10 M, 20 M, 40 M, 80 M, 100 M, 160 M, 200 M, 400 M, 800 M, 1024 M, etc.

In case 2, a virtual bandwidth within the system bandwidth, such as a portion of the system bandwidth, such as 5 M, 1.4 M, 180K.

In case 3, the resource of the LBT is the resource ready to be used by the UE.

The resource used by the UE includes: consecutive M physical RBs or resource particles, wherein M is less than or equal to the number of RBs included in the system bandwidth; one or more interleaving unit; one narrow band; and one or more clusters.

The size of one narrow band is 180 k, 1 PRB, or 1.4 M. One cluster contains consecutive N PRBs. Each PRB includes 12 subcarriers, the size of each subcarrier is n times of 7.5K, and n is a positive integer.

If the UE performs the LBT successfully at the above-mentioned frequency resource location, the UE adopts one of the following actions.

In action 1, the UE immediately transmits the prepared data.

In action 2, the UE adopts a self-delay mode and transmits data until a predefined timing is arrived.

The predefined timing includes: a subframe boundary, a symbol boundary.

If the UE fails to perform LBT, the UE needs to further identify whether occupation occurs by a UE in this cell of this system, and if yes, the UE may also transmit data to implement frequency reuse.

The identification method includes the following methods.

In the first method, it is identified by an occupancy signal or an initial signal.

The occupancy signal or initial signal is transmitted by other occupancy UE. The occupancy signal or the initial signal includes some reference signals such as a preamble sequence, a Demodulation Reference Signal (DMRS) sequence, and a Sounding Reference Signal (SRS) sequence.

The preamble sequence is taken as an example.

The preamble sequences used by different systems are different. Moreover, the preamble sequences of different operators are also different, and then further, the preamble sequences of different cells with the same operator are also different.

The preamble sequence is configured with the cell-specific value of by the base station. After the UE in the same cell identifies the sequence, it can transmit data.

For example, it is predefined to group the preamble sequence, and each group includes preamble sequences of different lengths. The operators may negotiate with each other to select different preamble sequence groups. Each group is then divided into a number of subgroups, and each subgroup is associated with a cell ID, and finally each cell corresponds to a unique preamble sequence group.

In the second method, it is identified by pattern.

When the full bandwidth is detected to be busy, the UE may further detect the energy of the frequency resource of the predefined pattern of the cell. If the energy of the frequency resource at the predefined location is detected to be lower than a threshold, the UE determines that the channel is occupied by a UE in the present cell and it can therefore continue to be used.

When the UE identifies that the resource is occupied by the UE in the present cell with same operator of the present system by one of the foregoing manners, the data transmission may be performed on the determined resource.

Fourth Embodiment

This embodiment describes a method for a UE to contend for access on a licensed carrier and resource usage.

Firstly, the UE determines which resources are the contended resources according to the resource division information received from the base station.

The following methods are included.

In the first method, the resource for contention access is determined by using the received RRC message or semi-statically configured information.

The resource mainly includes a frequency resource, and may also include a code domain resource, such as a reference signal sequence or a preamble.

In the second method, the contended resource is determined by the received dynamic DCI message.

The DCI information includes one of the following three types.

In the first type, the contention resource is determined by receiving the DCI scrambled by special information, for example, the DCI scrambled by the CB-RNIT is used for the allocation of the contention resource. The UE monitors the DCI if there is data to be transmitted, otherwise no blind detection is required.

In the second type, the location of the contended resource is determined by receiving a group scheduling DCI, and the DCI is also scrambled by a specific RNTI. The base station allocates UEs with the same geographical location to different groups according to the geographical locations of the UEs. The group of UEs determines the resource for its own use through receiving the DCI.

In the third type, it is transmitted by UE-specific DCI, and the resource allocation domains in the DCI of multiple UEs are the same.

Then, after the UE determines the location of the contention resource, the CCA is executed on the resource.

The CCA includes a cat4 LBT with a random backoff. The process includes: the UE performs channel detection on the resource indicated by the base station, if the channel idle is detected within t1 microseconds, a random number N is generated as a counter, and the UE continues to perform the channel detection; if the channel idle is detected within t2 microseconds, the value of N is subtracted by one; and if the channel is busy, the channel detection is continued until the value of N is reduced to 0, then data transmission is performed, or data is transmitted at the subframe boundary, where values of t1 and t2 are 25, 10 or 9.

The CCA also includes a contention approach using FBE of period t. t is a length of a Transmission Time Interval (TTI), such as 0.125 ms, 0.2 ms, 0.25 ms, 0.5 ms or 1 ms. For example, the UE performs channel detection based on a period of 0.2 ms. If the channel is detected to be busy at time T, the UE continues to perform the channel detection again at time T+0.2 ms, and if the channel is still busy, the channel detection is performed at T+0.4 ms, and if the channel is idle, the data may be transmitted.

By applying the channel busy and idle detection mechanism introduced in the contention resource to the licensed carrier, the collision problem caused by the data transmission directly when the terminal transmits the data is reduced, and the delay caused by the retransmission due to the collision is reduced.

Fifth Embodiment

This embodiment describes the structure of data transmission.

When the UE determines that data may be transmitted on the corresponding resource, the prepared data may be transmitted on the resource. The data transmission subframe structure includes the following two types of structure.

In the first type, a control area and a data area are included, and the control area and the data area are transmitted by different symbol time divisions.

Figure 2:
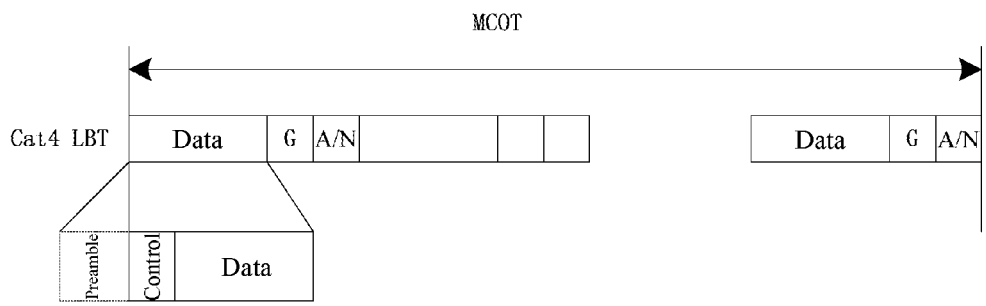
FIG. 2 is a schematic diagram illustrating a frame structure of data transmission according to an embodiment of the present disclosure.

In the second type, a preamble, a signaling area and a data area are included. As shown in FIG. 2, MCOT is the max channel occupy time, G is an interval (Gap), and A/N is ACK (positive)/NACK (negative).

The preamble is used for uplink synchronization and channel estimation, and the signaling area carries control information, including coded modulation information of the data and a size of the transport block.

The encoding scheme includes a Low Density Parity Check Code (LDPC) or a Tail Biting CC (TBCC). The modulation scheme includes Quadrature Phase Shift Keying (QPSK) or 16 Quadrature Amplitude Modulation (QAM).

Alternatively, the signaling area also carries the ID information of the UE.

For the data transmission mode of retransmission, the signaling area may also include the number of repeated subframes.

The data area mainly transmits data of the UE.

Alternatively, the signaling area and the data area each further includes at least one reference signal. The reference signal includes a Common Reference Signal (CRS) or a DMRS.

The subframe length is 1 ms, or 0.5 ms, or 0.2 ms, or 0.25 ms or 0.125 MS.

After the UE performs CCA successfully, m subframes may be continuously transmitted, m is less than or equal to n, and n is 4 ms, 6 ms, 8 ms or 10 ms.

The m subframes transmit the same data packet, or the t subframes in the m subframes transmit the same data packet.

When the transmitting end continuously transmits m subframes, one or two symbols need to be blanked on some intermediate time-frequency resource that is pre-defined or semi-statically configured by the upper layer, for other terminal in the same cell to perform CCA, so as to improve resource utilization rate successfully.

For example, the entire frequency domain locations of the last symbol and/or the first symbol of the positive integer times of 4 of the subframe is semi-statically configured by a high layer to be blank, then the UE needs to eliminate the data at the corresponding locations when transmitting the data.

Sixth Embodiment

This embodiment describes the determination of the contention access mode and the resource usage.

There are mainly two modes for the UE to access or transmit data. One mode is based on scheduling of the base station, including dynamic scheduling and semi-static scheduling (SPS). The terminal can transmit data only when the base station transmits indication information for data transmission. The other mode is that the UE may automatically transmit data by itself if there is data transmission without waiting for the base station to transmit scheduling signaling. This mode is called grant-free (scheduling-free) or grant-less data transmission mode. In this mode, there will be multiple terminals access at the same time, so there a contention occurs, which is called contention access.

There are two types of resource usage. One type is orthogonal resource usage, i.e., the resources of multiple UEs in a certain resource domain, including a space domain/time domain/frequency domain/code domain, are orthogonal, which is called Orthogonal Multiple Access (OMA). The other type is non-orthogonal resource usage, i.e., multiple UEs in the space/time/frequency/code resource domain are used in an overlapping manner, which is called Non-orthogonal Multiple Access (NOMA).

The combined use of the foregoing access mode and resource usage may include the following methods.

In the first method, it is chosen based on a service type.

For example, the service type transmitted periodically adopts the SPS scheduling mode, and the service type transmitted by the event trigger adopts the grant-free mechanism. Some time-domain moments are reserved for the service transmission of grant-free on the resource transmitted for the two service in a frequency division mode or in a periodic mode.

In the second method, a hybrid transmission mechanism for OMA and NOMA is determined based on the size of data packet.

The small packet is transmitted by the NOMA resource. If a large packet is to be transmitted, a Buffer Status Report (BSR) is transmitted to the base station, and the base station allocates the OMA resource to the UE.

The OMA resource is based on the base station scheduling, and NOMA is based on grant-less.

The frequency resource is divided, which is predefined or semi-statically configured by a RRC message.

In the third method, the UE performs CCA at a certain frequency position according to a fixed or configured sensing period, for example, a period of 1 ms, 2 ms or 4 ms. If the UE performs CCA successfully, it is checked whether there is a corresponding uplink grant (UL grant) at the time of the n-k, if yes, a single subframe or continuous multiple subframes are transmitted according to the UL grant; and if not, the data transmission is performed in an autonomous manner.

The autonomously transmitted content prefers data packet to be retransmitted, non-adaptive retransmission is adopted and retransmission is performed according to a predefined redundant version of the data packet.

In the fourth method, it is based on network side configuration and/or signaling indication. For example, the network side semi-statically configures the terminal to use the autonomous access mode for data transmission, then the terminal data access adopts the autonomous access mode. Or, the network side configures the terminal to perform data transmission by means of autonomous access at first, then the base station transmits scheduling information, in this case, the terminal performs data transmission based on the scheduling information.

In the fifth method, the determination is made according to a pre-divided time period. For example, a terminal may use contention access within a specified period of time, and need to wait for the base station scheduling to access at other time.

In the sixth method, the terminal selects the mode of autonomous access according to the service type, and then notifies the base station to perform blind detection and receiving.

In the seventh method, the transmitting end and the receiving end coordinate to determine the access mode used for data transmission.

When the licensed carrier transmits data, the transmitting end selects a corresponding frame structure according to the adopted access mode. For the frame structure of the scheduling access, there is no need to reserve a corresponding blank symbol. For the autonomous access mode, a predetermined blank symbol or gap needs to be reserved for other equipment for CCA listening.

Seventh Embodiment

The resource usage method based on the contention access provided by the embodiment of the present disclosure further includes the following.

The UE transmits the scheduling request in a contention-based mode. If the contention is successful, the base station transmits a UL grant, and then the UE transmits data based on the UL grant.

The process is described as follows.

When the UE has data to be transmitted, for example, if an urgent data packet needs to be transmitted, the UE immediately transmits a Scheduling Request (SR) to the base station, and the resource of the SR is a frequency domain location predefined or pre-configured by the base station.

Then, the UE starts to blindly detect the UL grant scheduling information transmitted by the base station. If the DCI of the UE is blindly detected by the UE within a predefined time window, it indicates that the UE successfully transmits the SR in the contention-based mode. If the DCI of the UE is not blindly detected, it indicates that the SR is failed to be transmitted in the last contention-based mode, and collides with the data transmitted by other UE, and the UE continues to transmit the SR immediately without wait until the UL grant transmitted by the base station is blindly detected.

If the UE chooses to transmit the SR on the unlicensed carrier, the UE may directly transmit the SR or first perform an intercepting for t microsecond, and the value of t may be 25 microseconds, 16 microseconds or 9 microseconds. If the channel is idle during this period of time, the UE may transmit the SR, and if it is busy, the intercepting continues to be performed until the idle time is found, then SR is transmitted.

Eighth Embodiment

Figure 3:
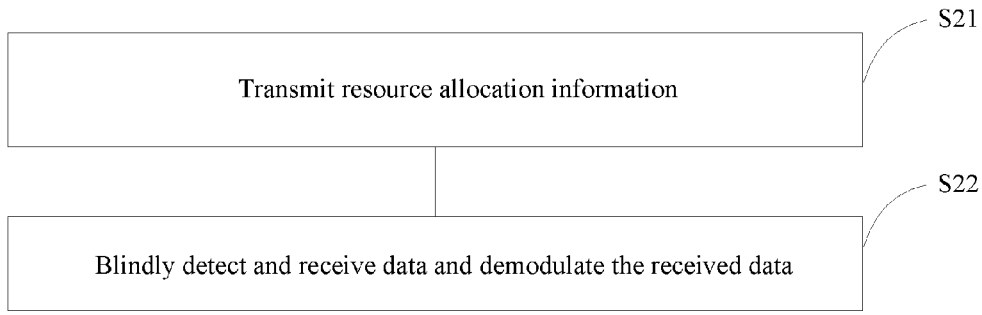
FIG. 3 is a flowchart illustrating a method for data transmission at a receiving end according to an embodiment of the present disclosure.

This embodiment is a method for data transmission at the receiving end. As shown in FIG. 3, the method in this embodiment includes the following steps.

In step S21, resource allocation information is transmitted.

In step S22, data is blindly detected and received, and the received data is demodulated.

The receiving end or the site receiving the data in the present embodiment includes a base station, a relay station, a node and some other UEs.

Taking the base station as an example, the base station configures the information of the contention resource, and then performs blind detection and receiving on the data, and finally feeds back ACK/NACK according to the demodulation result.

The resource configuration information is configured through a high layer signaling or transmitted through dynamic control information.

The receiving process of the receiving end includes: the receiving end is always in the receiving state or is always in the blind detection and receiving state. Or, the receiving end only converts to the receiving state at the time of the uplink subframe.

The receiving end then determines that the data is transmitted to itself through the preamble, the occupancy signal or the received data, then demodulates the data, and then determines which UE transmits the data by one of the following methods.

First Method:

It is determined which UE or UEs transmits the data by the DMRS sequence. For example, the base station configures a DMRS sequence for some UEs through the RRC message, or further configures different sequence cyclic shifts for different UEs through DCI.

Second Method:

The occupancy signal or the preamble signal carries the UE's own information, for example, the preamble sequence is associated with the ID of the UE or associated with the identity of the UE. Or, some candidate set information is limited by the preamble signal or the occupancy signal.

The above sequence or signal reduces the blind detection of the base station on the one hand, and is used to identify multiplexing on the other hand.

Third Method:

The data, or control domain or signaling domain contains UE ID identity information.

The receiving end determines that the data is transmitted by the UE of the own cell by receiving the UE ID identity of the corresponding area, and then demodulates the data.

Fourth Method:

The data is received through a defined time domain resource or frequency resource position.

If the receiving end receives correctly, the ACK information is transmitted at the corresponding timing subframe position, and the NACK is fed back if the receiving error occurs.

The size of the ACK is k bits, where k is greater than or equal to 1. When it is 1 bit, the ACK is transmitted only when the data transmitted by the transmitting end previously is received correctly. When it is k bits, it is the same as the number of transmitted data packets, and corresponds to the bitmap according to an order of the data packets.

The equipment in the embodiments of the present disclosure includes a base station (Node B), an evolved node B (eNode B), a Home Node B, a Relay Node (RN), User Equipment (UE), an access point and a site, etc. The first equipment and the second equipment are a data transmitting end and a receiving end.

Ninth Embodiment

The embodiment described how the equipment uses the same frequency resource with other UE with the same operator in the same cell by means of MU-MIMO, or the equipment uses the same frequency resource simultaneously with other UE with the same operator, or under the same base station, or in the same cell by means of NOMA.

Firstly, the frequency domain pattern that performs the LBT is pre-defined to be in association with users who can perform MU-MIMO or NOMA.

For example, if UE1 and UE2 can perform MU-MIMO, the two UEs are configured with the same CCA pattern. If UE3, UE4, UE5 and UE6 may perform transmission through the NOMA, the four UEs are configured with the same CCA pattern.

Alternatively, it is pre-defined to group the preamble sequence, and UEs in the same group may perform MU-MIMO or use NOMA to transmit data.

In this way, in the process of performing the LBT, the equipment may identify whether the data may be transmitted through the MU-MIMO or through the NOMA in the same frequency domain resource through the CCA pattern or the detection of the preamble sequence.

Alternatively, the preamble in the same group is further divided into n subgroups, and each subgroup is associated with a spreading sequence used by NOMA.

Tenth Embodiment

This embodiment describes the CCA mechanism corresponding to the contention access.

For data transmission between UEs by OFDM, the CCA includes the following.

If the equipment detects that the channel is busy, the equipment needs to wait, and transmits data until CCA is performed successfully.

The equipment only performs CCA on available resource and, if it is successful, the data is transmitted on successful resource.

For data transmission between UEs by MU-MIMO, the CCA includes the following.

The UE performs CCA according to a predefined frequency domain pattern, which is associated with an equipment capable of performing MU-MIMO transmission. The CCA patterns of the equipments that can perform MU-MIMO transmission on the same frequency resource are the same and corresponding to each other. The CCA patterns of user who cannot perform MU-MIMO are different.

Alternatively, the occupancy signal or the preamble is associated with an equipment capable of performing MU-MIMO. When the UE detects the channel by detecting the signal or the preamble, it identifies whether the MU-MIMO can be performed with the UE that has transmitted the data or occupied the channel. If the user is identified to be capable of performing the MU-MIMO, the data transmission may also be performed on the same frequency resource. If not, data cannot be transmitted on the same resource.

For data transmission between UEs by NOMA, the CCA includes the following.

The UE performs CCA according to a predefined frequency domain pattern, which is associated with an equipment capable of performing NOMA transmission. The CCA patterns of equipments that can perform NOMA transmission on the same frequency resource are the same and corresponding to each other. The CCA patterns of users who cannot perform NOMA are different.

Alternatively, the occupancy signal or the preamble may be associated with an equipment capable of performing NOMA. When the UE detects the channel by detecting the signal or the preamble, it can identify whether the NOMA can be performed with the UE that has transmitted the data or occupied the channel. If the user is identified to be capable of performing the NOMA, the data transmission is performed on the same frequency resource. If not, data cannot be transmitted on the same resource.

Further, the number of UEs having the same CCA pattern is less than or equal to a predefined threshold m.

In this way, the number of users who perform MU-MIMO or NOMA transmission is further limited, and the problem of poor system performance caused by too many users simultaneously transmitting on the same resource is avoided.

Figure 4:
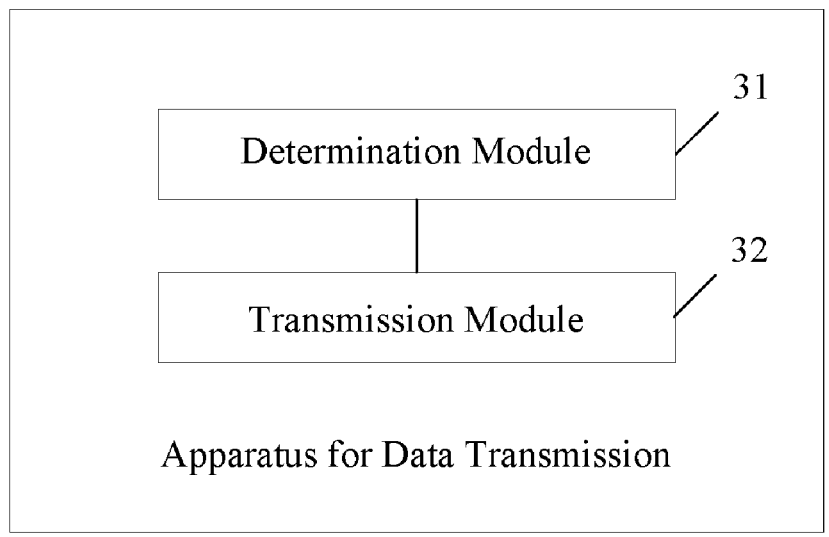
FIG. 4 is a schematic diagram illustrating an apparatus for data transmission at a transmitting end according to an embodiment of the present disclosure.

FIG. 4 is a schematic diagram illustrating an apparatus for data transmission at a transmitting end according to an embodiment of the present disclosure. As shown in FIG. 4, the apparatus for data transmission in this embodiment includes: a determination module 31, and a transmission module 32.

The determination module 31 is configured to determine, on pre-divided contention access-based resources for data transmission, contention resources for data transmission.

The transmission module 32 is configured to perform resource contention on determined contention resources, and transmit the data on the resource obtained by the contention.

In one embodiment, the determination module 31 is configured to determine the contention resources for data transmission by any of the following manners: determining the contention resources for data transmission by first reading declarative information of occupied resource or indication information of occupied resource transmitted by other equipment; or determining the contention resources for data transmission according to configuration information or dynamic signaling in a radio resource control (RRC) message of a base station.

The dynamic signaling includes: predefined downlink control information (DCI) that is scrambled by a radio network temporary identity or a specific information identity; or group scheduling DCI that is scrambled by a specific radio network temporary identity or a specific information identity.

In one implementation manner, the transmission module 32 is configured to perform, when the resource contention is performed on a licensed carrier, the resource contention by any of following manners: performing the resource contention by using a load-based equipment with random backoff; or performing the resource contention by using a frame-based equipment with a specified period.

In one implementation manner, the transmission module 32 is configured to transmit data directly on the resource obtained by contention; or receive usage information of the contention resource transmitted by other UE firstly, and then select remaining contention resource to directly transmit the data.

In one implementation manner, the transmission module 32 is configured to detect, when the resource contention is performed on an unlicensed carrier, whether an energy of a signal on the carrier is less than a threshold, if the energy is less than the threshold, transmitting the data directly; and if the threshold is greater than or equal to the threshold, performing a signal identification to identify whether the carrier is being used by a UE in present cell, if yes, transmitting the data on the carrier, and if not, transmitting no data.

In one implementation manner, a subframe structure of the transmitted data includes: one subframe, including a control area and a data area; or one subframe, including a preamble, a signaling area and a data area. The preamble is used to perform uplink synchronization, channel estimation or occupancy indication; the control area or the signaling area or the data area carries identification information of a terminal.

In one implementation manner, the transmission module 32 is configured to transmit m subframes continuously, where, m is greater than or equal to 1 and less than or equal to k, and k is a predefined value or a semi-statically configured value. When data of m subframes is continuously transmitted, one or two symbols on the specified time frequency resource are blank.

In one implementation manner, the transmission module 32 is configured to transmit the data on the resource obtained by contention by any of following manners: using different frequency resources with other UE in the same cell by means of FDM; using same frequency resource with other UE in the same cell simultaneously by means of MU-MIMO; using same frequency resource with other UE in the same cell simultaneously by means of NOMA; or using same frequency resource with other UE with same operator.

Figure 5:
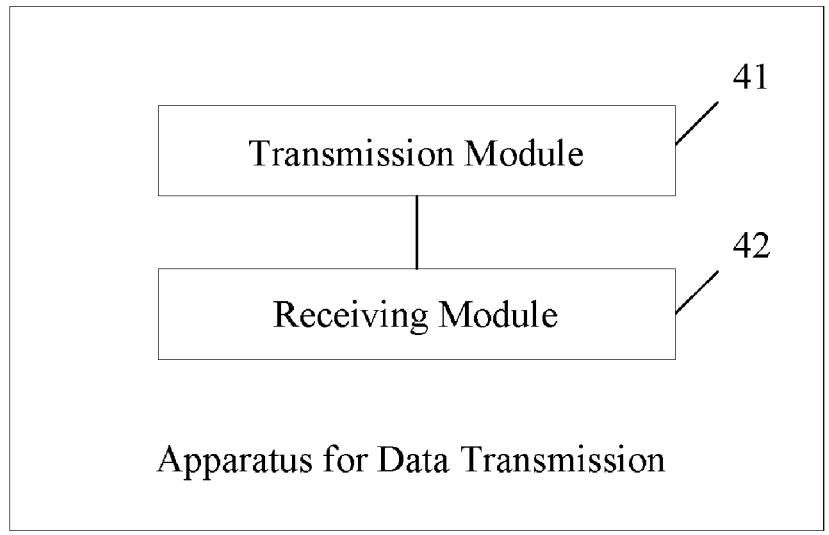
FIG. 5 is a schematic diagram illustrating an apparatus for data transmission at a receiving end according to an embodiment of the present disclosure.

FIG. 5 is a schematic diagram illustrating an apparatus for data transmission at a receiving end according to an embodiment of the present disclosure. As shown in FIG. 5, the apparatus in this embodiment includes: a transmission module 41, and a receiving module 42.

The transmission module 41 is configured to transmit resource allocation information.

The receiving module 42 is configured to blindly detect and receive data, and demodulate the received data.

In one implementation manner, the transmission module is configured to transmit the resource allocation information through a high layer signaling configuration or dynamic control information.

In one implementation manner, the receiving module is configured to receive data according to a demodulation reference signal sequence, an occupancy signal or a preamble signal, or identification information of a UE contained in a data area, a control area or a signaling area.

The embodiments of the present disclosure also provide a computer readable storage medium storing computer executable instructions, the computer executable instructions are executed to implement the data transmission method.

One of ordinary skill in the art will appreciate that all or a portion of the steps described above can be completed by a program to instruct related hardware, and the program may be stored in a computer readable storage medium, such as a read-only memory, a magnetic or optical disk, and the like. All or part of the steps of the above embodiments may also be implemented using one or more integrated circuits. Correspondingly, each module/unit in the foregoing embodiments may be implemented in the form of hardware or in the form of a software function module. Embodiments of the disclosure are not limited to any specific form of combination of hardware and software.

The above is only the embodiment of the present disclosure. The present disclosure can also have various other embodiments. Those skilled in the art can make various corresponding changes and modifications according to the present disclosure without departing from the spirit and substance of the present disclosure, but such corresponding changes and modifications are intended to fall within the protection scope of the appended claims.

INDUSTRIAL APPLICABILITY

The embodiments of the present disclosure provide a method and an apparatus for data transmission. On one hand, it can be used for licensed carriers to reduce resource collision between UEs under normal scheduling-free, and reduce delay caused by retransmission. On the other hand, it can also meet the regional regulatory requirements for unlicensed carrier transmission data. In addition, the delay caused by the original licensed-based access and the overhead of control signal are reduced, and the resource utilization rate can be improved.

What is claimed is:

1. A data transmission method, comprising:
   determining, on pre-divided contention access-based resources for data transmission, contention resources for data transmission; and
   performing resource contention on determined contention resources, and transmitting data on the resource obtained by the contention;
   wherein the performing the resource contention on the determined contention resources is implemented according to a predefined rule;
   wherein the predefined rule comprises at least one of:
   transmitting a Scheduling Request (SR) in a resource contention-based mode, and if scheduling indication information is received, transmitting the data according to the scheduling indication information;
   transmitting a data packet for the first time in the resource contention-based mode, and retransmitting the data packet according to a scheduling access mode; or
   when a data packet is less than or equal to a threshold, transmitting the data packet in the resource contention-based mode, and when the data packet is greater than the threshold, transmitting buffer status information to a network side to receive resource indication information for scheduling access allocation.

2. The method according to claim 1, wherein the determining the contention resources for data transmission is implemented by any one of following manners:
   determining the contention resources for data transmission by first reading declarative information of occupied resource or indication information of occupied resource transmitted by other equipment; or
   determining the contention resources for data transmission according to configuration information or dynamic signaling in a radio resource control (RRC) message of a base station.

3. The method according to claim 2, wherein
   the dynamic signaling comprises: predefined downlink control information (DCI) that is scrambled by a radio network temporary identity or a specific information identity; or group scheduling DCI that is scrambled by a specific radio network temporary identity or a specific information identity.

4. The method according to claim 1, wherein the transmitting the data on the resource obtained by contention comprises:
   transmitting the data directly on the resource obtained by contention; or
   receiving usage information of the contention resource transmitted by other UE firstly, and then selecting remaining contention resource to directly transmit the data.

5. The method according to claim 1, wherein, when the resource contention is performed on an unlicensed carrier, the transmitting the data on the resource obtained by contention comprises:
   detecting whether an energy of a signal on the carrier is less than a threshold, if the energy is less than the threshold, transmitting the data directly; and if the threshold is greater than or equal to the threshold, performing a signal identification to identify whether the carrier is being used by a UE in present cell, if yes, transmitting the data on the carrier, and if not, transmitting no data.

6. The method according to claim 1, wherein, a subframe structure of the transmitted data comprises any of followings:
    one subframe, comprising a control area and a data area; or
    one subframe, comprising a preamble, a signaling area and a data area.

7. The method according to claim 6, wherein,
the preamble is used to perform uplink synchronization, channel estimation or occupancy indication; and the control area or the signaling area or the data area carries identification information of a terminal.

8. The method according to claim 1, wherein, the transmitting the data on the resource obtained by contention comprises:
    transmitting data of m subframes continuously, wherein, m is greater than or equal to 1 and less than or equal to k, and k is a predefined value or a semi-statically configured value.

9. The method according to claim 1, wherein the transmitting the data on the resource obtained by contention is implemented by any of following manners:
    using different frequency resources with other UE in the same cell by means of frequency division multiplexing (FDM); or
    using same frequency resource with other UE in the same cell simultaneously by means of Multi-User Multiple-Input Multiple-Output (MU-MIMO); or
    using same frequency resource with other UE in the same cell simultaneously by means of Non-orthogonal Multiple Access (NOMA); or
    using same frequency resource with other UE with same operator.

10. The method according to claim 1, wherein,
the contention resource is a specific resource or a resource shared by multiple equipment.

11. The method according to claim 1, wherein, the performing the resource contention on the determined contention resources is further implemented by any of following manners:
    according to a network side configuration;
    according to a signaling indication; or
    according to a network side configuration and a signaling indication.

12. A data transmission apparatus, comprising:
a processor; and
a memory for storing instructions executable by the processor;
wherein the processor is configured to:
determine, on pre-divided grant-fee contention access-based resources for data transmission, contention resources for data transmission; and
perform resource contention on determined contention resources, and transmitting the data on the resource obtained by the contention;
wherein the processor is further configured to perform the resource contention on the determined contention resources according to a predefined rule;
wherein the predefined rule comprises at least one of:
transmitting a Scheduling Request (SR) in a resource contention-based mode, and if scheduling indication information is received, transmitting the data according to the scheduling indication information;
transmitting a data packet for the first time in the resource contention-based mode, and retransmitting the data packet according to a scheduling access mode; or
when a data packet is less than or equal to a threshold, transmitting the data packet in the resource contention-based mode, and when the data packet is greater than the threshold, transmitting buffer status information to a network side to receive resource indication information for scheduling access allocation.

13. The method according to claim 1, wherein,
the contention resources comprises: consecutive M physical resource blocks (RBs); consecutive N resource particles; K interleaving units; L narrow bands; or P clusters, wherein, M, N, K, L, P are positive integers greater than or equal to 1 and less than a predefined value.

14. The apparatus according to claim 12, wherein,
the contention resources comprises: consecutive M physical resource blocks (RBs); consecutive N resource particles; K interleaving units; L narrow bands; or P clusters, wherein, M, N, K, L, P are positive integers greater than or equal to 1 and less than a predefined value.

* * * * *